Patented July 17, 1934

1,966,833

UNITED STATES PATENT OFFICE 1,966,833

NONGLARE SAFETY GLASS

James H. Sherts, Brackenridge, Pa., assignor to Duplate Corporation, a corporation of Delaware No Drawing. Application August 11, 1930, Serial No. 474,375

3 Claims. (Cl. 49—81)

The invention relates to non-glare safety glass designed particularly for use in automobiles. Safety glass is ordinarily formed of two sheets of glass cemented to the opposite sides of a sheet of pyroxylin plastic, such as celluloid. The objects of the invention are (1) to provide safety glass which does not appear to be colored and which is, therefore, not conspicuous, (2) which reduces glare, (3) which is more transparent than ordinary safety glass, (4) and in which the deterioration of the plastic due to the actinic rays of light is reduced to a minimum.

Briefly stated, these results are achieved by using glass which contains a considerable amount of iron oxide and which, therefore, has a greenish color with a plastic sheet which is of natural color (as later explained) and, therefore, has an amber tint. The green of the glass neutralizes the amber tint of the plastic, giving a glass which is more nearly colorless in appearance than the ordinary run of safety glass.

The greenish glass with its relatively high iron oxide content filters out a very large percentage of the harmful actinic light rays, that is the so-called ultraviolet light rays which cause fatigue in the eyes and which tend to discolor and decompose the pyroxylin plastic sheet.

The pyroxylin plastic sheets have the natural amber tint incident to uncolored pyroxylin plastic. This tint is ordinarily eliminated in the manufacture of the plastic by adding blue and purple color ingredients which neutralize the amber shade and make it appear "water white", but these ingredients actually reduce the transparency of the material and tend to accelerate the discoloration of the plastic under the action of light, so that the expedient here employed of leaving the plastic with its natural amber tint, gives the advantages of a more transparent sheet and greater stability as to color and strength.

The safety glass produced by the combination heretofore pointed out, therefore, has the following advantages over ordinary safety glass:

(1) It is clearer (free from haze incident to the coloring ingredients ordinarily used in pyroxylin plastic used in safety glass).

(2) The plastic sheet will not decompose from actinic light, since it is protected by the sheets of glass.

(3) Eye fatigue due to glare from the road, oncoming headlights and the like is materially reduced due to the protection afforded by the color in the glass and plastic and to the fact that the glass protects against ultraviolet light.

(4) The green of the glass neutralizes the amber of the natural color pyroxylin, so that the glass is not objectionable in color to those who would object to the same amber color plastic between glass sheets of normally colored glass.

(5) The pyroxylin plastic is more permanent in color due to the fact that the usual color ingredients which are used in ordinary plastic and which accelerate discoloration are omitted.

What I claim is:

1. A plate of composite glass comprising a sheet of pyroxylin plastic substantially without coloring ingredients and having a natural amber tint and sheets of glass secured to the opposite sides of said plastic sheet having a green tint.

2. A plate of composite glass comprising a sheet of pyroxylin plastic substantially without coloring ingredients and having a natural amber tint and sheets of glass secured to the opposite sides of said plastic sheet and containing iron oxide which gives the glass a green tint.

3. A plate of composite glass comprising a sheet of pyroxylin plastic substantially without coloring ingredients, and having a faint natural amber tint, and sheets of glass secured to the opposite sides of said plastic sheet.

JAMES H. SHERTS.